US010591609B1

(12) United States Patent
 Pierro (10) Patent No.: US 10,591,609 B1
(45) Date of Patent: Mar. 17, 2020

(54) SYSTEM AND METHOD FOR PROVIDING ACCURATE POSITION LOCATION INFORMATION TO MILITARY FORCES IN A DISADVANTAGED SIGNAL ENVIRONMENT

(71) Applicant: Telephonics Corporation, Farmingdale, NY (US)

(72) Inventor: John Anthony Pierro, East Meadow, NY (US)

(73) Assignee: Telephonics Corp., Farmingdale, NY (US)

( * ) Notice: Subject to any disclaimer, the term of this patent is extended or adjusted under 35 U.S.C. 154(b) by 229 days.

(21) Appl. No.: 15/866,849

(22) Filed: Jan. 10, 2018

Related U.S. Application Data

(60) Provisional application No. 62/444,905, filed on Jan. 11, 2017.

(51) Int. Cl.
 *G01S 19/21* (2010.01)
 *G01S 5/10* (2006.01)
 *G01S 13/90* (2006.01)
 *G01S 19/11* (2010.01)

(52) U.S. Cl.
 CPC ............. *G01S 19/215* (2013.01); *G01S 5/10* (2013.01); *G01S 13/9005* (2013.01); *G01S 19/11* (2013.01)

(58) Field of Classification Search
 CPC ...... G01S 19/215; G01S 13/9005; G01S 5/10; G01S 19/11
 USPC ......................................................... 342/16
 See application file for complete search history.

(56) References Cited

U.S. PATENT DOCUMENTS

| | | | |
|---|---|---|---|
| 2,470,787 A | * | 5/1949 | Nosker ................... G01S 13/84 342/125 |
| 3,384,891 A | | 5/1968 | Andersen |
| 3,430,234 A | | 2/1969 | Wright |
| 3,471,856 A | | 10/1969 | Laughlin |
| 3,495,260 A | | 2/1970 | Laughlin |

(Continued)

OTHER PUBLICATIONS

Kyuman Lee, Hongjun Noh, and Jaesung Lim, Sensors, vol. 15, Issue 6, 12682-12699, May 28, 2015 Airborne Relay-Based Regional Positioning System.

(Continued)

*Primary Examiner* — Frank J McGue
(74) *Attorney, Agent, or Firm* — Thomas A. O'Rourke; Bodner & O'Rourke, LLP (57) ABSTRACT

A system for determining a location in a disadvantaged signal environment includes three aerial vehicles hovering at high altitude and spaced apart to form a triangle, and a mother aerial vehicle positioned a distance away and at a lower altitude. The mother aerial vehicle acquires and transmits coarse geolocation information, using a pulse compression, high-power X Band radar and directional antenna, to each of the three aerial vehicles to direct them to coarse geo-positions above designated respective ground locations. One of the three aerial vehicles has a synthetic aperture radar for producing a terrain strip-map that is mensurated against a map database to provide fine position adjustments for each of the three aerial vehicles, which are also also configured to transmit a respective signal coded with its latitude, longitude, and altitude, for a computing device to perform time difference of arrival measurements of the signals to determine its location.

22 Claims, 3 Drawing Sheets

(56) References Cited

U.S. PATENT DOCUMENTS

| | | | |
|---|---|---|---|
| 3,554,995 A | 1/1971 | McCray | |
| 3,611,379 A | 10/1971 | Deckett | |
| 3,705,404 A | 12/1972 | Chisholm | |
| 3,742,498 A | 6/1973 | Dunn | |
| 3,789,409 A | 1/1974 | Easton | |
| 3,810,179 A | 5/1974 | Merrick | |
| 3,836,970 A | 9/1974 | Reitzig | |
| 3,852,750 A | 12/1974 | Klein | |
| 3,886,553 A | 5/1975 | Bates | |
| 3,988,734 A | 10/1976 | Elwood | |
| 5,999,129 A | 12/1999 | Rose | |
| 6,167,263 A * | 12/2000 | Campbell | B64B 1/06 244/164 |
| 6,249,252 B1 | 6/2001 | Dupray | |
| 6,407,703 B1 | 6/2002 | Minter | |
| 6,529,820 B2 | 3/2003 | Tomescu | |
| 6,618,016 B1 | 9/2003 | Hannan | |
| 6,785,553 B2 | 8/2004 | Chang | |
| 6,819,291 B1 | 11/2004 | Lackey | |
| 6,911,936 B2 | 6/2005 | Stayton | |
| 6,961,019 B1 | 11/2005 | McConnell | |
| 7,043,355 B2 | 5/2006 | Lai | |
| 7,292,935 B2 | 11/2007 | Yoon | |
| 7,460,870 B2 | 12/2008 | Moeglein | |
| 7,711,476 B2 | 5/2010 | Chiou | |
| 7,904,244 B2 | 3/2011 | Sugla | |
| 7,990,314 B2 | 8/2011 | Liao | |
| 8,086,351 B2 | 12/2011 | Gaudiano | |
| 8,155,666 B2 | 4/2012 | Alizadeh-Shabdiz | |
| 8,922,421 B2 | 12/2014 | Pomietlasz | |
| 9,218,741 B2 | 12/2015 | Wu | |
| 2007/0001898 A1 | 1/2007 | Twitchell | |
| 2007/0222665 A1 | 9/2007 | Koeneman | |
| 2008/0042901 A1 | 2/2008 | Smith | |
| 2008/0168059 A1 | 7/2008 | Bull | |
| 2017/0178518 A1 * | 6/2017 | Foladare | G08G 5/0034 |
| 2018/0109959 A1 * | 4/2018 | Larsson | H04W 16/18 |

OTHER PUBLICATIONS

Kyuman Lee, Hoki Baek, and Jaesung Lim, Sensors, vol. 16, Issue 8, Aug. 2016, Enhanced Positioning Algorithm of ARPS for Improving Accuracy and Expanding Service Coverage.

Wen-Qin Wang, Jingye Cai, and Lin Wang, Radar Conference, 2009 IET International, Apr. 2009, GPS-Disciplined Waveform Synthesis for Distributed Radar Systems.

Enhanced Position Location Reporting System. Wikipedia, Dec. 15, 2016, available at: https://en.wikipedia.org/wiki/Enhanced_Position_Location_Reporting_System.

* cited by examiner

SYSTEM AND METHOD FOR PROVIDING ACCURATE POSITION LOCATION INFORMATION TO MILITARY FORCES IN A DISADVANTAGED SIGNAL ENVIRONMENT

CROSS REFERENCES TO RELATED APPLICATIONS

This application claims priority on U.S. Provisional Application Ser. No. 62/444,905, filed on Jan. 11, 2017, the disclosures of which are incorporated herein by reference.

FIELD INVENTION

The present invention relates to providing and/or obtaining position information in a hostile environment, and more particularly relates to a position, navigation, and timing, system that is highly jam-resistant and spoof-resistant.

BACKGROUND OF THE INVENTION

The availability of accurate positional information is often crucial for conducting military operations and other covert operations. The availability of GPS signals enable the use of smart bombs, and advanced navigation systems. The challenges of conducting operations in a GPS-denied or GPS-spoofed territory persist, and pose a serious threat to the success of future missions—threats that can result in consequential loss to life and property. In the case of GPS-spoofing, it has already been utilized to command an air vehicle to "safe-land" in hostile territory as a result of reliance on erroneous GPS data. In 2011, the nation of Iran captured a batwing stealth drone by spoofing the GPS signals that it received, tricking the drone into landing at what it believed was its home base, but was actually a location well within Iran's borders.

Early in 2016 the U.S. Air Force and the Navy each requested proposals for back-up technology that would supplement or supplant the use of GPS in the instance where a similar spoofing, or an outright denial of GPS signals may be experienced.

The present invention is directed to such a system that overcomes problems that may be experienced with position, navigation, and timing systems.

Some early position, navigation, and/or position/navigation-related technology is shown by the following U.S. Patent and Patent Application Publications: U.S. Pat. No. 2,470,787 to Nosker; U.S. Pat. No. 3,384,891 to Andersen; U.S. Pat. No. 3,430,234 to Wright; U.S. Pat. No. 3,471,856 to Laughlin; 3,495,260 to Laughlin; U.S. Pat. No. 3,554,995 to Bottenberg; U.S. Pat. No. 3,611,379 to Deckett; U.S. Pat. No. 3,705,404 to Chisholm; U.S. Pat. No. 3,742,498 to Dunn; U.S. Pat. No. 3,789,409 to Easton; U.S. Pat. No. 3,810,179 to Merrick; U.S. Pat. No. 3,876,970 to Reitzig; U.S. Pat. No. 3,852,750 to Klein; U.S. Pat. No. 3,880,553 to Bates; U.S. Pat. No. 3,988,734 to Elwood; U.S. Pat. No. 4,114,155 to Raab; U.S. Pat. No. 4,161,730 to Anderson; U.S. Pat. No. 4,179,693 to Evans; U.S. Pat. No. 4,253,098 to Blythe; U.S. Pat. No. 4,359,733 to O'Neill; U.S. Pat. No. 4,386,355 to Drew; U.S. Pat. No. 4,472,720 to Reesor; U.S. Pat. No. 4,839,656 to O'Neill; U.S. Pat. No. 4,987,420 to Inamiya; U.S. Pat. No. 5,014,066 to Counselman; U.S. Pat. No. 5,017,926 to Ames; U.S. Pat. No. 5,432,520 to Schneider; U.S. Pat. No. 5,521,817 to Burdoin; U.S. Pat. No. 5,944,770 to Enge; U.S. Pat. No. 5,999,124 to Sheynblat; U.S. Pat. No. 5,999,129 to Rose; U.S. Pat. No. 6,167,263 to Campbell; U.S. Pat. No. 6,249,252 to Dupray; U.S. Pat. No. 6,407,703 to Minter; U.S. Pat. No. 6,529,820 to Tomescu; U.S. Pat. No. 6,618,016 to Hannan; U.S. Pat. No. 6,785,553 to Chang; U.S. Pat. No. 6,819,291 to Lackey; U.S. Pat. No. 6,911,936 to Stayton; U.S. Pat. No. 6,961,019 to McConnell; U.S. Pat. No. 7,043,355 to Lai; 2007/0001898 to Twitchell; 2007/0222665 to Koeneman; U.S. Pat. No. 7,292,935 to Yoon; 2008/0042901 to Smith; 2008/0158059 to Bull; U.S. Pat. No. 7,460,870 to Moeglein; U.S. Pat. No. 7,711,476 to Chiou; U.S. Pat. No. 7,904,244 to Sugla; U.S. Pat. No. 7,990,314 to Liao; U.S. Pat. No. 8,086,351 to Gaudiano; U.S. Pat. No. 8,155,666 to Alizadeh-Shadbiz U.S. Pat. No. 8,922,421 to Pomietlasz; and U.S. Pat. No. 9,218,741 to Wu.

OBJECTS OF THE INVENTION

It is an object of the invention to provide apparatus that permits Special Operations Forces (SOF) and other users to rapidly determine if GPS spoofing is occurring.

It is a further object of the invention to provide a system that circumvents GPS spoofing or outright denial of GPS signals in a hostile territory.

It is another object of the invention to provide a system that supplements or replaces the use of GPS in the instance where spoofing or outright denial of GPS signals is experienced in a hostile territory.

Further objects and advantages of the invention will become apparent from the following description and claims, and from the accompanying drawings.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a system for determining a location in a disadvantaged signal environment may include a plurality of aerial vehicles at a first altitude and being spaced apart between five to fifty miles, and typically being spaced at least twenty-five miles apart, and may be uniformly space apart, and with a mother aerial vehicle positioned a distance away from the plurality of aerial vehicles at a second altitude. The mother aerial vehicle, such as the radar-equipped Navy MH-60R ASW Helicopter, may typically be positioned at an altitude of less than 10,000 feet AGL, while the plurality of aerial vehicles are each typically positioned at a much higher altitude, to be above adverse weather, and above a range capability of anti-aircraft artillery guns in the area.

The plurality of aerial vehicles may each be configured to hover, and may preferably be spaced apart to form a triangle. The mother aerial vehicle may be configured to acquire and transmit coarse geolocation information to each of the plurality of aerial vehicles to direct each of the plurality of aerial vehicles to coarse geo-positions above a designated respective ground location. The mother may be equipped with a pulse compression, high-power X Band radar and a directional antenna that may be used to transmit the coarse geolocation information to each of the plurality of aerial vehicles using an X band TDL of TCDL link, with a beam width of one degree and side lobe levels of less than 40 dB. The X band radar may have a bearing accuracy of 0.2 degrees rms and an rms range measurement accuracy of less than two hundred feet, for coarsely locating the UAV's in 3D space within a spherical error. probable of 1000 feet when the distance is 50 nautical miles or less. The coarse geolocation information may be transmitted using frequency hopped spread spectrum waveforms to increase jam resistance.

The plurality of aerial vehicles may include one master aerial vehicle, and two secondary aerial vehicles each synchronized with the master aerial vehicle using a stable rubidium reference oscillator on the master aerial vehicle. The master aerial vehicle may be equipped with a synthetic aperture radar (SAR) or other equipment configured to produce a terrain strip-map, and may be further configured to mensurate the strip-map against a map database to provide fine position adjustments for each of the plurality of aerial vehicles. Alternatively, each of the plurality of aerial vehicles may also be equipped with a SAR to provide itself with its own fine position adjustments. The terrain strip-map may be menstruated against a level two digital terrain elevation map dataset to provide tine position adjustments for each of the plurality of aerial vehicles for a respective positional accuracy being within thirty meters; or alternatively, the terrain strip-map may be mensurated against a google earth map to provide fine position adjustments for each of the plurality of aerial vehicles for a respective positional accuracy being within three meters.

Each of the plurality of aerial vehicles may also be equipped with a receiver, and a transmitter configured to transmit a respective signal over an ISM band frequency that is coded with its latitude, longitude, and altitude, and modulated with non-random, non-repeating patterns, so that a ground-based (or an air-based) computing device may perform time difference of arrival measurements of the respective signals to determine a location of the computing device. The location being so derived may be compared to a GPS derived location to determine of GPS spoofing is occurring in the region.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all, of the following possible combinations; A alone; or B alone; or C alone; or A and B together; or A and C together; or B and C together; or A, B and C together, Also, all references (e.g., patents, published patent applications, and non-patent literature) that are cited within this documents are incorporated herein in their entirety by reference.

Furthermore, the described features, advantages, and characteristics of any particular embodiment disclosed herein, may be combined in any suitable manner with any of the other embodiments disclosed herein.

Figure 1:
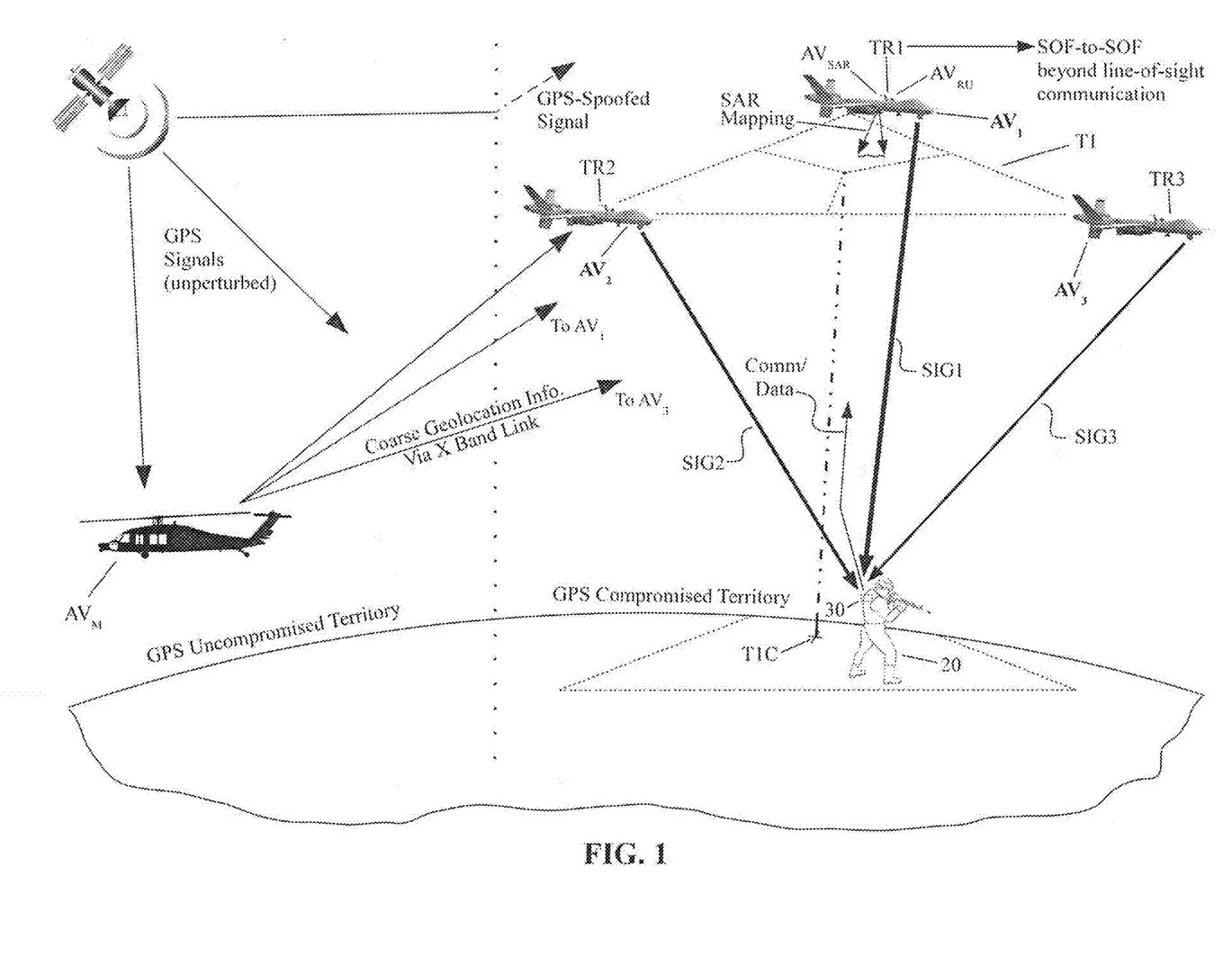
FIG. 1 illustrates a first arrangement for deploying the system disclosed herein for providing jam-resistant and spoof-resistant location signals in support of an air or ground operation or other type of operation.

FIG. 1 illustrates a first system and arrangement for providing highly jam-resistant and spoof-resistant location signals in support of an air, sea., or ground operation. As shown in FIG. 1, three widely spaced, precisely located air vehicles may preferably be used. The air vehicles may be any suitable air vehicle, including, but not limited to aircraft (e.g., jet aircraft),helicopters, hot air balloons, unmanned aerial vehicles (UAVs). such as the Boeing A160T, "pseudolites" (i.e., pseudo-satellites), stratollites and other advanced balloons such as those made by World View, etc. In one embodiment the air vehicles used may exhibit a low radar cross-section. Any generic use of "UAV" as a descriptor for the air vehicle hereinafter is used merely for convenience, and is not intended to limit the types of air vehicles that may be utilized in the system and method described herein. Also, in certain embodiments discussed hereinafter, the system and method may be utilized in conjunction with platforms other than air vehicles. However, merely to simplify the presentation, an exemplary discussion follows that is made solely with reference to air vehicles, without intending certain embodiments to be so limited.

The air vehicles may preferably be flying at high altitudes above the ground level (AGL). Flying at high altitudes may generally enable the air vehicles to operate free from attack, and the precise altitude utilized may correspond to the available intelligence data for each particular mission. The altitude selection is particularly important for certain missions, because the air vehicles may preferably operate in a hover mode to provide the most accurate position location information, and must avoid anti-aircraft artillery (AAA) gunfire to survive. The enemy air defense radar capability may also be factored into placement of the UAVs, particularly its capability to detect low radar cross-section air targets that may be tens of miles distant.

For example, if intelligence data suggests that there are only 37 mm anti-aircraft guns in the area which have a maximum effective altitude of 15,000 feet AGL, or may be a MALE drone (i.e., a tactical UAV hovering at altitudes of up to 18,000 feet AGL, or may be a MALE drone (i.e., medium altitude, long endurance drone), as MALE drones may fly up to 30,000 feet. If intelligence data indicates potentially hostile use of 85 mm AAA in the mission corridor, which have a maximum effective vertical firing range of around 34,000 feet, a HALE drone (high altitude, long endurance drone) may be utilized, as HALE drones may fly at altitudes well in excess of 30,000 feet. Therefore, air vehicle selection may correspond to the mission-specific environment. In general, an altitude of at least 20,000 feet may be preferable to place the three spaced apart air vehicles out of both audible (hearing) range and sighting range.

Moreover, in various other embodiments, the apparatus forming the system disclosed herein is not limited to use the described scenario involving air vehicles, as the herein disclosed apparatus may also be covertly positioned on the rooftops of buildings, or on buoys anchored off-shore, or on small raft or other watercraft anchored far away. In one embodiment miniature drones, each of which may weigh only ounces and which have the ability to navigate autonomously, can be used and be directed to land at concealed locations on roof-tops. Note that a tradeoff with such an embodiment may be greater likelihood of multipath and potentially lower Effective Isotropic Radiated Power (EIRP) due to limited prime power (i.e., reliance on battery power) and a very limited antenna size. Even submersible vehicles with suitable antenna(s) may be utilized in certain embodiments. Use of the lowest technology and least expensive platform type may be preferred, to minimize the potential loss in case of a failure or an unforeseen attack, as long as the particular platform selected may perform adequately to satisfy the anticipated mission criteria/conditions.

In an embodiment where air vehicles are utilized, an added benefit of positioning them at a high altitude is that it typically places the air vehicles above adverse weather, and away from winds that may cause buffeting that would tend to displace each of the vehicles from its designated stationary position. Such temporal displacements may affect accuracy or may reduce on-station time. The high altitudes also generally serves to maximize covertness of the three UAV's. In one embodiment, the platforms may be located at a minimum altitude of 20,000 feet AGL to ensure that they cannot be detected either visually by hostile forces on the ground, or through an audible sound. The higher altitudes may also benefit the suppression of multipath. Multipath suppression (and jam resistance) will also be aided by prudent waveform selection such as wideband direct sequence spread spectrum (DSSS) for the Time Difference of Arrival (TDOA) measurements discussed hereinafter.

Figure 2A:
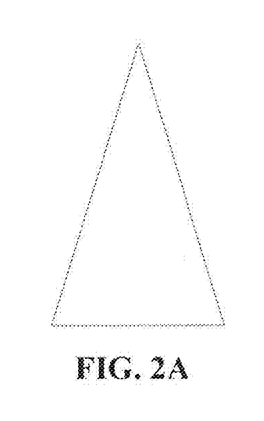
FIG. 2A illustrates an isosceles triangular shape that may be used for positioning of the air vehicle platforms deployed in the system of FIG. 1.
Figure 2B:
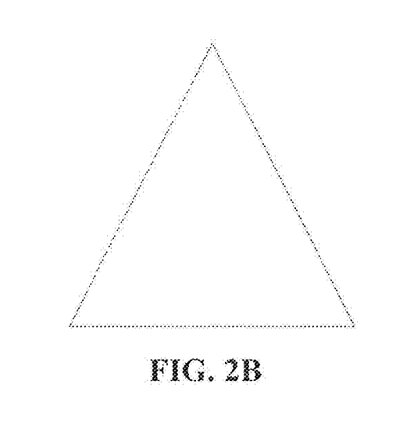
FIG. 2B illustrates an equilateral angular shape that may be used for positioning of the air vehicle platforms deployed in the system of FIG. 1.

The three stationary platforms may preferably be positioned to be widely spaced apart, and may, in one embodiment, be spaced between live miles to fifty miles apart, and may be uniformly spaced apart. In other embodiments, other spacing distances that support proper signal transmission/reception may be used. The three platforms may preferably also be positioned at the corners of an imaginary triangle T1. In one embodiment, the three platforms may be placed at the corners of an imaginary isosceles triangle (FIG. 2A), which may be an equilateral isosceles triangle (FIG. 2B).

The three stationary air vehicle platforms need to be synchronized, because the process of geolocation for the air, sea, or ground operation relies on time difference of arrival measurements of the three UAV signals by the user interface (e.g., computing device) on the ground, as discussed hereinafter frequencies must be identical as well as the modulations on each of the three carriers. In order to time-align the received signals at the user's location, the modulation of the carriers must contain non-random, non-repeating patterns and these patterns must be synchronized in time to support unique time-alignments at the user interface. Therefore, in one embodiment, one of the air vehicle platforms is designated as the "master" (e.g., $AV_1$), as the other two air vehicle platforms (e.g., $AV_2$ and $AV_3$) each have their frequency and timing synchronized to that of the master platform $AV_1$.

The master platform $AV_1$ may be equipped with a highly stable Rubidium reference oscillator $AV_{R1}$ that provides precise frequency and timing information for the trio of platforms. Also, each of the three air vehicles $AV_1$, $AV_2$, and $AV_3$ may be equipped with phase-stable, delay-matched receivers and transmitters (TR1, TR2, and TR3) that may operate in the UHF/microwave region (e.g., roughly 425 MHz to 2.4 GHz). The transmitters may make use of circuitry to maximize re-use and reduce SWaP-C, although the process of transmitting coordinate information does not require phase stability and/or control of delay, as required for transmitting of the time difference of arrival signals discussed hereinafter, because any perturbations and/or differences may result in synchronization errors and may manifest as geolocation measurement errors to the mission participants in the air, sea, or ground operation.

The rubidium reference oscillator on the master platform generates a highly stable 6.834,682,612 GHz microwave reference frequency with long term stability $5\times10^{-12}$. All commercial rubidium frequency standards operate by disciplining a crystal oscillator to the hyperfine transition 6.834, 682,612 GHz in rubidium. This reference is input to a divide by 3 frequency divider to produce a 2.278227537 GHz reference signal which is then amplified and distributed wirelessly to each of the two synchronized UAV's. Translation to this S-Band frequency obviates the need for separate, dedicated, antenna and receiver electronics to distribute the reference when the system operating frequency is in the 2.3 to 2.4 GHz range. The close proximity of reference and operating frequencies permits hardware sharing which in turn reduces overall hardware SWaP-C. To derive a rubidium disciplined 10 MHz reference, the 2.278227537 GHz signal is received by the two synchronized UAVs, amplified, filtered, and further conditioned to serve as the system clock reference for a direct digital synthesizer (DDS). The output of the DDS is a rubidium-disciplined 10 MHz sine wave reference which serves as the timing reference for all timing-critical operations.

In addition to the three platforms (e.g., air vehicles $AV_1$, $AV_2$, and $AV_3$) being positioned in the triangular pattern, a "mother" air vehicle platform $AV_M$ may be utilized in the system. The mother platform $AV_M$ may be any of the above-described platform types. In another embodiment the mother air vehicle platform $AV_M$ may be an airborne warning and control aircraft (AWACS/AEWCS), including, but not limited to the Northrop Grumman E-2 Hawkeye, the Boeing E3 Sentry, etc. In yet another embodiment the mother platform $AV_M$ may be a suitably equipped helicopter (i.e. carrying a suitable radar system), including, but not limited to the Navy's MH-60R antisubmarine warfare (ASW) helicopter. The army's STARLite Radar-equipped MQ-1C Gray Eagle may also be used. The mother air vehicle $AV_M$ may be positioned at a safe stand-off distance away from the other three stationary air vehicles, and typically (i.e., in one embodiment) it may reach a maximum altitude of 10,000 feet. Other altitudes may also be utilized. Also, typically (i.e., in one embodiment) the three triangular-positioned platforms $AV_1$/$AV_2$/$AV_3$ may be positioned at a higher altitude than that of the mother platform. In other embodiments, the three triangular-positioned platforms $AV_1$/$AV_2$/$AV_3$ may be positioned at a lower altitude than that of the mother platform, or at the same altitude.

The mother air vehicle $AV_M$ may preferably be a significant distance away from the adverse territory (i.e., away from the GPS-denied/GPS-spoofed territory), being positioned where the GPS signals are uncompromised. In one embodiment the mother air vehicle $AV_M$ may be a distance away from the three air vehicles $AV_1$/$AV_2$/$AV_3$ that may be 10 times the spacing between the trio of air vehicles. In another embodiment the mother air vehicle $AV_M$ may be a distance away from the three air vehicles $AV_1/AV_2/AV_3$ that may be 20 times the spacing between the trio of air vehicles. In yet another embodiment the mother air vehicle $AV_M$ may be a distance away from the three air vehicles $AV_1/AV_2/AV_3$ that may be at least 50 times the spacing between the trio of air vehicles. In a further embodiment the mother air vehicle $AV_M$ may be a distance away from the three air vehicles $AV_1/AV_2/AV_3$ that may be at least 100 times the spacing between the trio of air vehicles. Thus, the mother air vehicle $AV_M$ may be positioned many hundreds of miles away from the three triangular-positioned air vehicles $AV_1/AV_2/AV_3$.

Being so positioned the mother air vehicle $AV_M$ may be able to receive unperturbed GPS signals and in turn may transmit coarse geolocation information via an X-Band link to each of the three. stationary air vehicles $AV_1/AV_2/AV_3$, and may thereby command and/or direct them to approximate locations in 3D space, as follows. The radar used on the mother air vehicle $AV_M$ to geo-locate the three stationary air vehicles $AV_1/AV_2/AV_3$ in space is preferably a wide instantaneous bandwidth, high resolution radar system, which facilitates highly accurate distance measurement of the UAVs. This radar also has the ability to locate the targets azimuthally to within fractions of a degree by virtue of its physically large antenna and beam splitting function. (Note the elevation of the three air vehicles $AV_1/AV_2/AV_3$ is determined by highly accurate barometric sensors). This radar used on the mother air vehicle $AV_M$ may utilize pulse compression, high average power X Band signals (i.e., average power being 200-300 watts). Therefore, two important attributes of this radar system are its excellent bearing accuracy of 0.2 degrees rms and an RMS range measurement accuracy of less than two hundred feet. Thus, in one embodiment, the radar may be capable of coarsely locating the three stationary air vehicles $AV_1/AV_2/AV_3$ in 3D space within a Spherical Error Probable (SEP) of 1000 feet at standoff distances of up to 50 nautical miles from the mother air vehicle $AV_M$. The radar system used on the mother air vehicle $AV_M$ may also incorporate a communications function to allow it to "talk" to the three stationary air vehicles to transmit such position information, and it may therefore be equipped with a communications channel to transmit coordinate information at low data rates to the UAVs. A small portion (e.g., <5%) of the radar timeline may be appropriated and assigned to support this communications function. The mother air vehicle $AV_M$ may use this communication function of the radar to transmit the measured initial position (i.e., latitude and longitude data) to each of the UAVs, and also the coordinates (latitude and longitude) for the final required/designated positions. This communication feature of the radar is an enhancement to Applicant's MH-60R radar, and may be the subject of a separate application.

However, for the range and azimuth measurements to be accurate, advance knowledge of both the altitude of the mother air vehicle $AV_M$ and the altitudes of the three stationary air vehicles $AV_1/AV_2/AV_3$ is required. The mother air vehicle $AV_M$ may have an integral wideband microwave altimeter to accurately determine its altitude. The altitude of the master air vehicle $AV_1$ may also be determined via its own on-board wideband microwave altimeter. In one embodiment, the altitude of the three stationary air vehicles $AV_1/AV_2/AV_3$ will not be transmitted back to the mother ship, and so the altitude of the master air vehicle $AV_1$ (and therefore all three air vehicle) may be preset to be (e.g., to be 20,000 ft.).

Furthermore, to prevent the coarse geolocation information transmitted to the 3 UAVs from the mother air ship $AV_M$ via the X Band link from becoming compromised in the same way that the GPS signals may be spoofed, the X Band link will be configured to exhibit very good jam resistance through the use of a highly directional antenna that uses a very narrow beam width (e.g., on the order of 1 degree), and uses extremely low side lobe levels (e.g., <40 dB). Frequency hopped spread spectrum waveforms may also be employed to increase its jam resistance.

In one embodiment, to improve latitude and longitude measurement accuracy even further, the coarsely-positioned master air vehicle $AV_1$ may be configured for terrain and feature mapping using an onboard high resolution synthetic aperture radar (SAR) $AV_{SAR}$ that is capable of generating a SAR strip-map of a scene, and is further configured for mensurating the map against a map database. (Note—in general, mensuration is the process of measuring a feature or location on the earth to determine an absolute latitude, longitude, and elevation). The SAR strip-map may be mensurated with a terrain reference, such as Level II Digital Terrain Elevation Data (DTED) "maps," which consist of digital datasets containing a matrix of terrain elevation values. (Note—Level II DTED has post spacing of approximately 30 meters—See, Military Specification Digital Terrain Elevation Data (DTED) MIL-PRF-89020B). Therefore, this only yields a positional accuracy for each of the three UAVs of only 30 meters. Note, the reference imagery may also be digital precision database (DPPDB) imagery supplied by the National Geospatial Intelligence Agency (NGA). Registration with geospatial database provides capability to refine position information and tie the derived information to a validated targeting source using a proprietary log-polar transform (modLPT) registration algorithm.

The synthetic aperture radar $AV_{SAR}$ of the master air vehicle $AV_1$ may also be configured for mensurating the SAR strip-map from the onboard SAR radar against Google Earth maps of the disadvantaged territory that may be stored in the database, which requires knowledge of a SAR image depression angle (or grazing angle) and platform elevation, both of which are available. This permits the coarsely-positioned master air vehicle $AV_1$ to thereafter constantly provide finer adjustments to its position. Accurate differential repositioning of the other two platforms may also be subsequently done. This may result in each of the three platforms $AV_1/AV_2/AV_3$ being located within several meters of a desired true position, even when at high altitudes. (Note, in other embodiments, each of the two synchronized platforms $AV_2/AV_3$ may alternatively be configured to be able to make its own fine position adjustments).

The master air vehicle $AV_1$ transmits respective initial locations and final desired locations to the synchronized air vehicles $AV_2/AV_3$. On board each the three platforms $AV_1/AV_2/AV_3$ may be a highly accurate grade Inertial Navigation System (INS) capable of maintaining true position to within 1 nautical mile over 24 hour period without updates. During the mensuration process the three UAVs may be in close proximity (i.e., within one to two meters) of one another. To program their initial locations, the INS on-board each of the two synchronized UAVs $AV_2/AV_3$ is initialized with the measured latitude/longitude data from the master air vehicle $AV_1$, which data may be transmitted to the two synchronized UAVs immediately upon the master air vehicle $AV_1$ having determined its own true position based on the mensuration process. Waypoints (i.e., destination coordinates in terms of latitude and longitude, and perhaps altitude as well) that represent the final desired locations for correct system operation and desired ground coverage may then be programmed in this manner.

After each of the three triangular-positioned platforms $AV_1/AV_2/AV_3$ are precisely positioned within several meters of its desired true position, Time Difference of Arrival (TDOA) measurements may be made using signals respectively transmitted by the three UAV's. The TDOA measurements may be made using a tactical computing device 30 possessed by the mission participant(s) 20 who must directly interact in the GPS comprised territory, and who require accurate position location information (PLI) within the hostile theatre. The mission participant(s) 20 may include, but is/are not limited to, a fifth air vehicle, a surface vehicle, an amphibious vehicle, an isolated Special Forces soldier, a team of soldiers, etc.

The ruggedized tactical computing device (TCD) is a potentially powerful tool that may not only support geolocation in hostile areas, but which can also ferret out GPS spoofing. The TCD may also function to "call in" air support and/or supply targeting information via the UAV(s), using an application, including, but not limited to "MAFIA" (Maneuver Aviation and Fires Integrated Application), which was developed by the U.S. Army Aviation and Missile Research, Development and Engineering Center (AMRDEC). The platforms may thus also be configured to form a beyond-line-of-sight communication link to either another airborne platform for relay to the ground, or to other overhead assets. The three UAVs can serve as a wideband "hot spot" enabling disparately located SOFs to communicate with and transfer data between one another over distances that far exceed the capabilities of ground based hot spots. The very high EIRP and wide band (approaching 84 MHz) may permit high data rate transfer of information.

In one embodiment, the computing device 30 that may be provisioned with the mission participant(s) 20 may be a variant of a ruggedized iPhone with GPS, which may also be configured to receive the signals from the three UAV's $(AV_1/AV_2/AV_3)$ and may perform the required computations via an application load. Each of the three UAVs may transmit a unique coded reference signal (SIG1, SIG2, SIG3) to allow the ruggedized combatting device 30 to separate one signal from another, and, knowing the signal's origin, it may compute the time difference of arrival. Each of the reference signals (SIG1, SIG2, SIG3) may be coded to include its latitude, longitude, and altitude, which may be refreshed at a rate of 5 Hz. The ruggedized computing device 30 may also include a barometric sensor configured to provide elevation information that may be needed for the geolocation process. Altitude may also be obtained from a wideband S-band radar altimeter. Coding methods that may be used for the reference signals may include, but are not limited to, Direct Sequence (DS/SS) coding, and Frequency Hopping (FH/SS) coding.

The signals from the three UAVs may be covertly transmitted over segments of the ISM band (e.g., 2.4 GHZ), which may be used for the Wi-Fi connection of the ruggedized computing device 30. For additional covertness it is also possible in one embodiment, with the appropriate permissions, to "bury" the UAV signals in any of the cellular bands below 2.4 GHz. For example, a country friendly to the west (e.g., a NATO country such as Estonia) may be targeted by a hostile invading force and the invading force may jam the GPS over wide areas of the country. In this instance, without any prior agreement with the invaded nation, Estonia may object to NATO usurping and/or interfering with its cellular network. However, if DSSS signals are utilized, they could take on a clandestine character and not interfere with normal cellular communications.

Providing the mission participants 20 with the ability to process both GPS signals and the UAV signals simultaneously allows the Special Operations Forces (SOF) soldier/team, to rapidly determine if spoofing is occurring. Spoofing can be determined by comparing the latitude/longitude data derived from the GPS signals, with the same data derived from the UAV signals (SIG1, SIG2, SIG3), the existence of significant differences would indicate that spoofing is occurring. When spoofing is occurring, reliance on GPS signals would necessarily be avoided, and navigation would principally be through use of the position data obtained from the UAV signals, which may constantly provide accurate geo-locations for the mission participants. Typical GPS signal conditions are such that outdoor signal levels of less than −130 dBm are commonly encountered, and as many as five satellites may be required. Therefore, the much higher signal levels used in the system and arrangement disclosed herein and the use of fewer reference sources may enable this signal acquisition and TDOA measurements to ordinarily be a vastly simpler undertaking, and may provide substantially improved accuracy and reliability for the geolocation information thereby obtained by the mission participants.

With respect to the geolocations thereby provided by the TDOA measurements from the UAV signals, the geolocation accuracy may be improved (i.e., may be maximized) when the mission participants 20 are roughly located at the normal projection T1C of the geometric center of an equilateral isosceles triangle (see FIG. 1) that is formed by the three air vehicles $AV_1/AV_2/AV_3$.

As noted above, in cine embodiment the distance between the UAVs may be between 5-50 miles. In another embodiment the UAVs may be positioned to be spaced at least 25 miles apart, which spacing may be uniform. Other distances for spacing may also be used that would support proper signal transmission/reception. Varying this spacing (i.e., increasing or decreasing the distance between UAVs) may serve to improve and/or diminish certain aspect of the system's performance. Closer spacing between the UAVs may in certain cases diminish the benefits to the mission participants because the area in square miles for the theatre of ground operations concomitantly becomes more limited. A five-mile spacing between three UAVs positioned at the theoretical corners of an equilateral isosceles triangular provides roughly 10.8 square miles of projected ground area coverage, while a ten-mile spacing provides 43.3 square miles of projected area. For greatest accuracy (e.g., to minimize Geometric Dilution of Precision), the mission participants 20 should be positioned within the boundaries of the triangle projected on the ground (i.e., be in its "shadow"). Geospatial errors can be 10× greater at a position on a boundary of the triangle, as compared to geospatial errors at the center of the triangle. With an equilateral triangular for the UAV spacing, as shown for example in FIG. 1, acceptable performance may readily be expected within a circle of radius 3.53 miles having an area approximately equal to 40 square miles, which should be adequate for most expeditionary missions Increasing the spacing between the master and synchronized UAVs may result in degraded location accuracy for the synchronized UAVs (with respect to latitude and longitude, not elevation). The SAR radar $AV_{SAR}$ on the master platform $AV_1$, operating in its high bearing accuracy mono-pulse mode, is responsible for locating the synchronized UAVs accurately in azimuth space. Under high signal-to-noise (SNR) conditions (e.g., >14 dB), the accuracy degrades linearly with the distance, d, between master and slave UAV's. At greater distances, d, where SNR is progressively less, the azimuth accuracy will vary approximately in accordance with $1/d^{3/2}$. The distance measurement accuracy will however vary as $1/d^{1/2}$.

The mission participant(s) on the ground is affected differently; increased spacing has the benefit of increasing the measurement baseline and, as in any interferometric (TDOA) measurement system, increasing the spacing (or baseline) increases measurement accuracy. Of course, as with any generalization, there are limits to its validity. RMS accuracy will vary as $1/d^{1/2}$ due to variation in SNR. In the design of the system, high EIRP conditions may be maintained so that SNR never drops below 20 dB and impacts to accuracy are minimized.

Figure 2C:
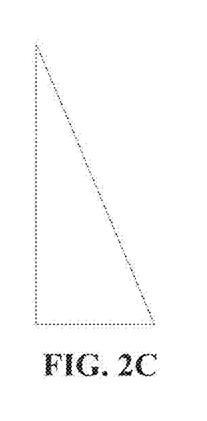
FIG. 2C illustrates a scalene triangular shape that may be used for positioning of the air vehicle platforms deployed in the system of FIG. 1.
Figure 2D:
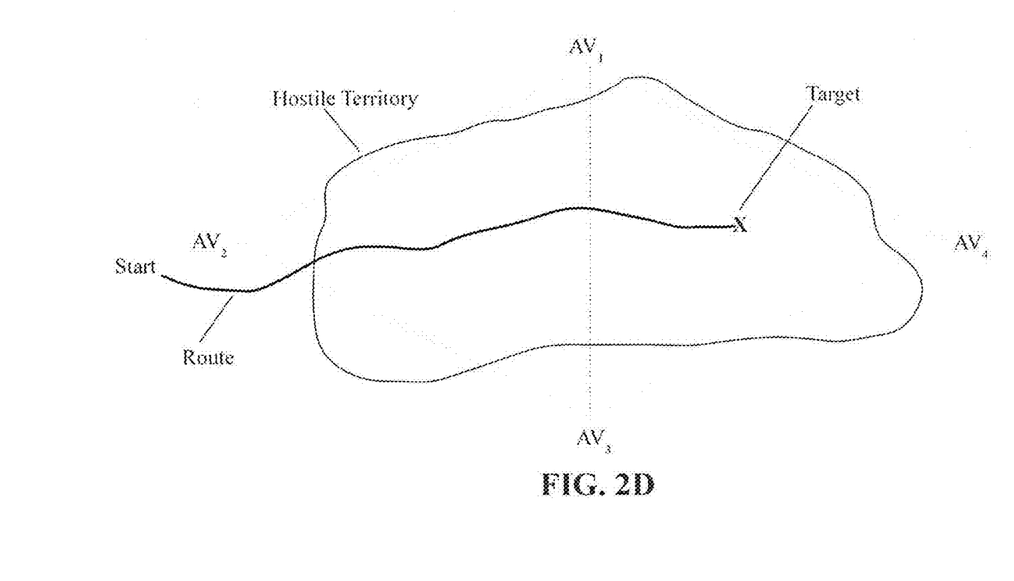
FIG. 2D illustrates use of four air vehicle platforms for the system disclosed in FIG. 1.
Figure 3:
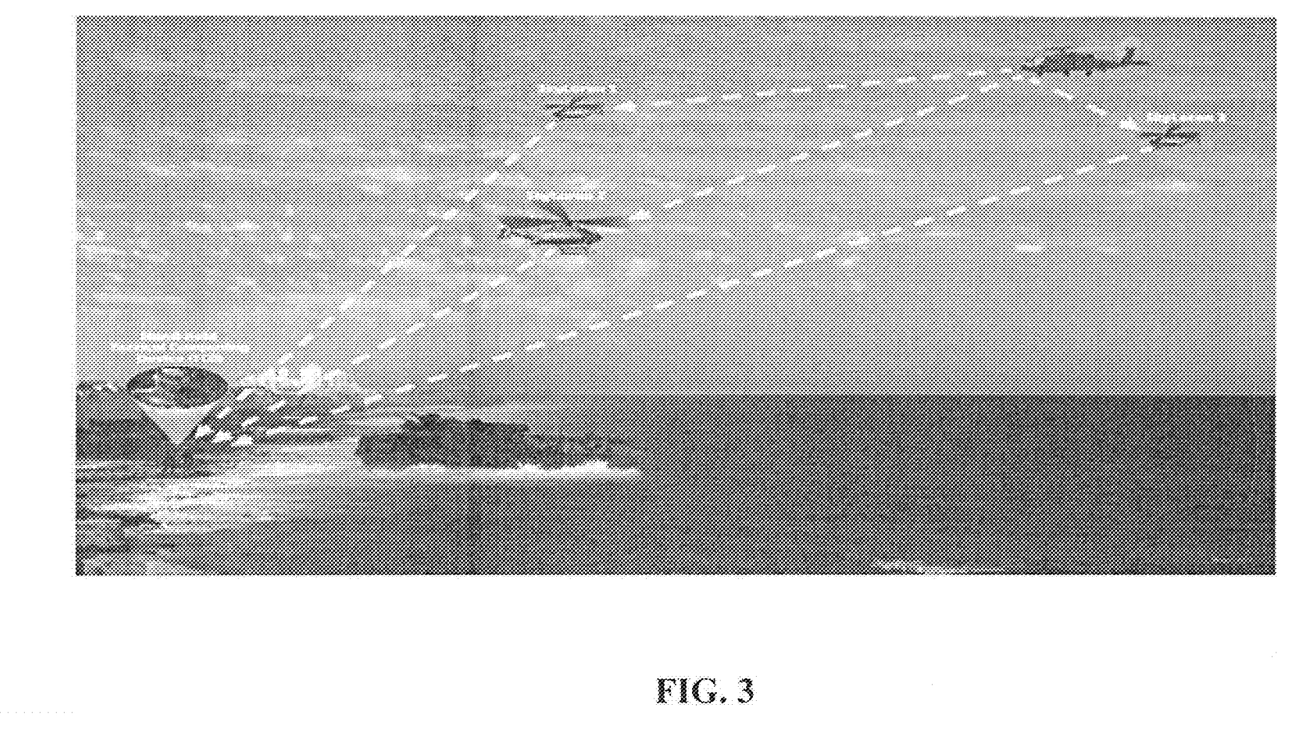
FIG. 3 illustrates use of the present invention for landing an expeditionary force in a denied area, where a landing craft and personnel rely on the system for accurate navigation to designated points of interest.

It should also be noted that the route and ultimate target location in the hostile territory for the mission participants 20 is more often than not fixed is 3D space. Therefore, in order for the mission participants 20 to be generally centered with respect to the triangle T1 formed by the three air vehicles $AV_1/AV_2/AV_3$ (or at least be underlying it), the UAVs must be positioned with respect to that route and the target, and the triangle thereby formed, may in certain cases need to be repositioned throughout the course of the mission. For example, if the mission participants must traverse a long distance (e.g., 27 miles) within a hostile GPS-spoofed territory, and if the UAVs are spaced 5 miles apart, the triangular positioned UAVs ($AV_1/AV_2/AV_3$) may preferably drift uniformly in 3D space in correspondence with the progress of the mission participants along the 27 mile route (see e.g., FIG. 2D), to maintain the provision of optimal positional accuracy. Alternatively, as shown in FIG. 2D, an additional UAV $AV_4$ may be timely commanded into position to form a second triangle, to continue to provide accurate positional information to the mission participant 20, rather than requiring the UAVs $AV_1/AV_2/AV_3$ to drift uniformly. Also, all four UAVs may be utilized from the outset, and may form a parallelogram shape. Other geometric shapes may also be used. Also, a plurality of UAVs positioned to form an odd shaped array may be utilized, so that no movement may be necessary to provide positional information throughout the course of an extended operation. Also, additional platforms can further benefit geolocation accuracy, particularly in areas away from sea level and in mountainous areas.

In certain cases, particularly in mountainous terrain, use of only the signals from the three air vehicles $AV_1/AV_2/AV_3$ not be sufficient to locate the mission participants in 3D space; however, in one embodiment the mission participants 20 may also measure his/her altitude (e.g., via an accurate barometric sensor in the hand-held device that determines pressure altitude, which may be converted to geometric altitude, and may preferably be accurate to within 10 to 20 meters). The altitude measurement may be done automatically, and without any operator involvement.

The centralized location for the mission participants 20 with respect to the normal projection T1C or the geometric center of the triangle minimizes the Geometrical Dilution of Precision (GDOP), and results in the lowest positioning error. For that reason, the optimal triangular shape that may be formed by the three UAVs may preferably be an equilateral triangle, which is a particular type of isosceles triangle in which all three sides (rather than just two sides) of the triangle are congruent. Note a scalene triangle as shown in FIG. 2C may also be used, but the sides of any theoretical triangle used for positioning the UAVs would desirably be close in length. If the triangle utilized becomes quite exaggerated, the accuracy will be degraded (e.g., if using an obtuse triangle with the one obtuse angle being much greater than ninety degrees; or using an acute triangle with two of the an ales each approaching ninety degrees such that it has one very short side and two much longer sides). The GDOP and UAV placement accuracies will both tend to degrade.

Minimizing GDOP is a goal, and its effect on PLI accuracy is illustrated in the following example.

With a spherical error probable of, for example, 100 feet, and a GDOP that may approach 10 when the user straddles one of the sides of the imaginary triangle, the positioning error could approach 1000 feet. The "volume" of the Spherical Error Probable is a function of the accuracy of the rms elevation, latitude, and longitude measurements. For accurate elevation data the system will depend on the radar altimeter of the UAVs, since the EGI (GPS+INS) will be disabled due to the disadvantaged environment. For altimeter bandwidths approaching 200 MHz the elevation measurement will be accurate to within three feet, not the limiting case for SEP. The latitude and longitude measurements may, however, limit SEP. Initial accuracy may be a function of the range measurement accuracy and azimuth pointing accuracy of the X-Band radar on board the mother UAV $AV_1$, which is 200 feet and 1000 ft. rms, maximum, respectively. Initial development of this state of the art radar was accomplished by Telephonics Corp. in the 1990's. The X-Band radar is the radar of choice for a number of demanding military missions. The latitude and longitude measurement accuracies assumed are consistent with the bandwidth and azimuth half power beam-width (HPBW) properties of this radar and the mode design that we will utilize.

As noted herein above, another source of error is the relative motion between the UAVs $AV_1/AV_2/AV_3$ due to buffeting caused by wind gusts and other disturbances. By implementing the master/synchronized arrangement and monitoring and recording displacement of the platforms using the platform INS, the effects of platform motion on geolocation accuracy can be suppressed. However, to maintain position accuracy information, the master UAV location coordinates, as established through the mensuration process, may preferably be maintained by exercising platform controls as needed The following is a series of steps for geo-locating mission participants in a GPS denied area, some or all of which steps may be used in various different embodiments:

1. Three air vehicles that are intended to occupy a stationary position in support of a covert mission leave a base of operation and hover in close proximity to each other near the location of the covert operation, which stationary position is known by a mother air vehicle.
2. One of the three air vehicles is designated the master UAV and will have its own on-board wideband microwave altimeter that is used to position the three air vehicles at a preset altitude, which is known by the mother Air Vehicle (e.g., 20,000 ft.).
3. The master air vehicle synchronizes each of the three air vehicles (i.e., provides precise frequency and timing information therebetween) using a stable rubidium reference oscillator on the master air vehicle, and using phase-stable, delay-matched receivers and transmitters on each of the three vehicles.
4. The mother air vehicle leaves a base of operation (e.g., a navy destroyer, aircraft carrier, land base, etc. and navigates to a designated geo-position (perhaps hundreds of miles away from the location of the covert operation and from the position three air vehicles), where it may acquire unperturbed GPS signals and obtain position info.

5. The mother air vehicle positions itself at a predetermined altitude (e.g., 10,000' AGL) using an onboard wideband microwave altimeter.

6. The mother air vehicle geo-locates the three closely positioned air vehicles in space using an onboard wide instantaneous bandwidth, high resolution radar, which facilitates highly accurate distance measurement of the UAVs.

7. The mother air vehicle radar transmits two locations to the master air vehicle via an X band link with a very narrow beam width—
 i) the measured initial position (latitude and longitude) of the three air vehicles; and
 ii) the final required spaced-apart positions for each of the three air vehicles, which may be spaced apart positions that form a triangular shape.

8. The three air vehicles each maneuver from the closely spaced initial positions to the respective required coarse geo-positions.

9. The master air vehicle uses an onboard synthetic aperture radar to produce a terrain strip-map and mensurates the terrain strip-map against a map database to acquire fine position adjustments for each of the three air vehicles.

10. The master air vehicle transmits the fine position adjustments needed to the other two air vehicles, which are programmed into an INS system used on each of the three air vehicles.

11. The three air vehicles each maneuver to be stationary at the respective fine-adjusted positions to form a triangular shape.

12. Each at the three UAVs transmit a unique reference signal that is coded to include its latitude, longitude, and altitude.

13. The covert ground/air/sea mission forces use a barometric sensor to determine pressure altitude, which is converted to geometric altitude above mean sea level by a computing device.

14. The covert ground/air/sea mission forces use the computing device to make time difference of arrival (TDOA) measurements of the coded signals in combination with the acquired geometric altitude for accurately determining their geo-location.

15. The accurate geo-location acquired from the TDOA measurements may be compared with a GPS-derived geo-location of the mission participants to determine if GPS spoofing is occurring.

16. The mission proceeds with the mission participants preferably remaining within the ground projection of the triangle formed by the three air vehicles to ensure greater positional accuracy.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A system for determining a location in a disadvantaged signal environment, said system comprising:
 a plurality of aerial vehicles at a first altitude and spaced apart;
 a mother aerial vehicle, said mother aerial vehicle positioned a distance away from said plurality of aerial vehicles at a second altitude; said mother aerial vehicle configured to acquire and transmit coarse geolocation information to each of said plurality of aerial vehicles to direct each of said plurality of aerial vehicles to coarse positions above respective ground location;
 wherein said plurality of aerial vehicles comprise a master aerial vehicle, and one or more secondary aerial vehicles each synchronized with said master aerial vehicle;
 wherein said master aerial vehicle comprises a synthetic aperture radar configured to produce a terrain strip-map; and wherein said master aerial vehicle is further configured to mensurate said strip-map against a map database to provide fine position adjustments for each of said plurality of aerial vehicles;
 wherein each of said plurality of aerial vehicles comprises a receiver, and a transmitter configured to transmit a respective coded signal; and
 a computing device configured to perform time difference of arrival measurements of said respective signals to determine a location of said computing device.

2. The system according to claim 1, wherein said master aerial vehicle comprises a stable rubidium reference oscillator configured to provide frequency and timing data for said secondary aerial vehicles to be synchronized with said master aerial vehicle.

3. The system according to claim 2, wherein said stable rubidium reference oscillator is configured to operate in the range of 425 MHz to 2.4 GHz.

4. The system according to claim 1, wherein each said coded signal comprises a respective latitude, longitude, and altitude and modulated with non-random, non-repeating patterns.

5. The system according to claim 4, wherein each said coded signal is transmitted over an ISM band frequency.

6. The system according to claim 5, wherein each said respective coded signal is refreshed at a rate or 5 Hz.

7. The system according to claim 1, wherein each of said plurality of aerial vehicles are configured to hover above said respective ground location.

8. The system according to claim 1, wherein said master aerial vehicle is configured to mensurate said strip-map against a level two digital terrain elevation map dataset to provide fine position adjustments for each of said plurality of aerial vehicles for a respective positional accuracy of within thirty meters.

9. The system according to claim 1, wherein said master aerial vehicle is configured to mensurate said strip-map against a google earth map to provide fine position adjustments for each of said plurality of aerial vehicles for a respective positional accuracy being within three meters.

10. The system according to claim 1, wherein said mother aerial vehicle is configured to transmit the coarse geolocation information to each of said plurality of aerial vehicles via an X-Band link.

11. The system according to claim 1, wherein said mother aerial vehicle comprises a pulse compression, high-power X Band radar configured to transmit the coarse geolocation information to each of said plurality of aerial vehicles.

12. The system according to claim 11, wherein said X band radar is configured to transmit coarse geolocation information to each of said plurality of aerial vehicles with a directional antenna.

13. The system according to claim 12, wherein said directional antenna is configured to use a beam width of approximately one degree with sidelobe levels of less than 40 dB.

14. The system according to claim 13, wherein said directional antenna is configured to use frequency hopped spread spectrum waveforms to increase jam resistance.

15. The system according to claim 14, wherein said X band radar comprises a bearing accuracy of 0.2 degrees rms and an rms range measurement accuracy of less than two hundred feet.

16. The system according to claim 1, wherein said X band radar is configured to coarsely locating the UAV's in 3D space within a spherical error probable of 1000 feet when said distance is 50 nautical miles or less.

17. The system according to claim 1, wherein said plurality of aerial vehicles comprises three aerial vehicles spaced apart to form a triangular shape.

18. The system according to claim 17, wherein said plurality of aerial vehicles are spaced between five miles and ten miles apart.

19. The system according to claim 18, wherein said plurality of aerial vehicles are spaced apart to form an equilateral triangle.

20. The system according to claim 1, wherein said first altitude is higher than said second altitude.

21. The system according to claim 1, wherein said first altitude is selected to be above adverse weather, and above a range capability of anti-aircraft artillery gunfire.

22. The according to claim 1, wherein each of said secondary aerial vehicles comprise a synthetic aperture radar configured to produce said terrain strip-map and to mensurate said terrain strip-map against said map database to independently provide fine position adjustments.

* * * * *